United States Patent
Hou et al.

(10) Patent No.: US 11,188,344 B2
(45) Date of Patent: Nov. 30, 2021

(54) APPARATUS AND METHOD FOR GENERATING INTERMEDIATE LAYER VALUES IN PARALLEL

(71) Applicant: Winbond Electronics Corp., Taichung (TW)

(72) Inventors: Chien-Ti Hou, Taichung (TW); Wu-Chuan Cheng, Taichung (TW)

(73) Assignee: Winbond Electronics Corp., Taichung (TW)

( * ) Notice: Subject to any disclaimer, the term of this patent is extended or adjusted under 35 U.S.C. 154(b) by 0 days.

(21) Appl. No.: 17/163,587

(22) Filed: Feb. 1, 2021

(65) Prior Publication Data

US 2021/0240483 A1     Aug. 5, 2021

(30) Foreign Application Priority Data

Feb. 3, 2020    (TW) ................................ 109103232

(51) Int. Cl.
    *G06F 9/30*          (2018.01)
    *G06F 9/38*          (2018.01)
    (Continued)

(52) U.S. Cl.
    CPC ........ *G06F 9/3893* (2013.01); *G06F 9/30101* (2013.01); *G06F 9/30189* (2013.01);
    (Continued)

(58) Field of Classification Search
None
See application file for complete search history.

(56) References Cited

U.S. PATENT DOCUMENTS 11,055,608 B2 *   7/2021   Bichler ................. G06N 3/0454
2020/0026992 A1 *   1/2020   Zhang ..................... G06N 3/049
(Continued)

OTHER PUBLICATIONS

Mao et al.; MAX2: An ReRAM-Based Neural Network Accelerator That Maximizes Data Reuse and Area Utilization; IEEE; Jun. 2019 (Year: 2019).*

(Continued)

*Primary Examiner* — Corey S Faherty
(74) *Attorney, Agent, or Firm* — JCIPRNET

(57) ABSTRACT

A memory apparatus and an operation method thereof are provided. The memory apparatus includes a mode configuration register, a system memory array, a pointer and an arithmetic circuit including logic operation units. The mode configuration register stores weight matrix information and a base address. The system memory array stores feature values in a feature map from the base address according to the weight matrix information. The pointer stores the base address and a weight matrix size to provide pointer information. The arithmetic circuit sequentially or parallelly reads the feature values according to the pointer information. The arithmetic circuit parallelly arranges weight coefficients of a selected weight matrix and the corresponding feature values in each of the corresponding logic operation units according to the weight matrix information, and causes the logic operation units to perform computing operations parallelly to output intermediate layer feature values to an external processing unit.

18 Claims, 10 Drawing Sheets

(51) Int. Cl.
*G06F 9/54* (2006.01)
*G06F 9/355* (2018.01)
*G06N 3/08* (2006.01)
*G06N 3/04* (2006.01)
*G06N 3/063* (2006.01)

(52) U.S. Cl.
CPC ............ *G06F 9/3557* (2013.01); *G06F 9/544* (2013.01); *G06N 3/0454* (2013.01); *G06N 3/063* (2013.01); *G06N 3/08* (2013.01)

(56) References Cited

U.S. PATENT DOCUMENTS

2021/0097375 A1* 4/2021 Huynh ....................... G06F 7/78
2021/0182077 A1* 6/2021 Chen ......................... G06N 3/02

OTHER PUBLICATIONS

Gao et al.; Reconfigurable Hardware Generation for Tensor Flow Models of CNN Algorithms on a Heterogeneous Acceleration Platform; SmartCom 2018, LNCS 11344, pp. 87-96, 2018 (Year: 2018).*

* cited by examiner

| | MAC_1 | MAC_2 | MAC_3 | MAC_4 | MAC_5 |
|---|---|---|---|---|---|
| BF1 | W11 W12 W13 | W11 W12 W13 | W11 W12 W13 | W21 W22 W23 | W21 W22 W23 |
| BF2 | X11 X21 X31 | X12 X22 X32 | X13 X23 X33 | X11 X21 X31 | X12 X22 X32 |
| BF3 | Z11 | Z12 | Z13 | Z21 | Z22 |

| | MAC_6 | MAC_7 | MAC_8 | MAC_9 |
|---|---|---|---|---|
| BF1 | W21 W22 W23 | W31 W32 W33 | W31 W32 W33 | W31 W32 W33 |
| BF2 | X13 X23 X33 | X11 X21 X31 | X12 X22 X32 | X13 X23 X33 |
| BF3 | Z23 | Z31 | Z32 | Z33 |

| | Address | Data | A1 | A2 | A3 | A4 |
|---|---|---|---|---|---|---|
| PI_1 ⇨ | 1 | X11 | X11 | | | |
| | 2 | X21 | X21 | | | |
| | 3 | X31 | X31 | | | |
| PI_2 ⇨ | 4 | X12 | X12 | X12 | | |
| | 5 | X22 | X22 | X22 | | |
| | 6 | X32 | X32 | X32 | | |
| PI_3 ⇨ | 7 | X13 | X13 | X13 | X13 | |
| | 8 | X23 | X23 | X23 | X23 | |
| | 9 | X33 | X33 | X33 | X33 | |
| PI_4 ⇨ | 10 | X14 | | X14 | X14 | X14 |
| | 11 | X24 | | X24 | X24 | X24 |
| | 12 | X34 | | X34 | X34 | X34 |
| | 13 | X15 | | | X15 | X15 |
| | 14 | X25 | | | X25 | X25 |
| | 15 | X35 | | | X35 | X35 |
| | 16 | X16 | | | | X16 |
| | 17 | X26 | | | | X26 |
| | 18 | X36 | | | | X36 |

FIG. 6D

APPARATUS AND METHOD FOR GENERATING INTERMEDIATE LAYER VALUES IN PARALLEL

CROSS-REFERENCE TO RELATED APPLICATION

This application claims the priority benefit of Taiwan application serial no. 109103232, filed on Feb. 3, 2020. The entirety of the above-mentioned patent application is hereby incorporated by reference herein and made a part of this specification.

BACKGROUND

Technical Field

The disclosure relates to a memory architecture, and more particularly to a memory apparatus capable of performing artificial intelligence (AI) operations and an operation method thereof.

Description of Related Art

With the evolution of AI operations, the application range of AI operations has become wider and wider. For example, neural network models are used to perform neural network operations such as image analysis, speech analysis, and natural language processing. Therefore, various technical fields continue to invest in the research and development and application of AI, and various algorithms adapted for the convolutional neural network (CNN) and the deep neural network (DNN) are constantly being introduced.

No matter which algorithm is used for neural network operations, the amount of data used in the hidden layer is very large to achieve the effect of machine learning. Along with this, the data transfer amount of the processing chip to its external memory apparatus also increases significantly. However, in the current Von Neumann architecture, the memory apparatus assumes a passive role, which provides only the function of data reading and data writing and does not have the function of performing AI operations. Therefore, a large amount of data reading and data writing between the processing chip and the memory apparatus becomes a bottleneck difficult to overcome in increasing the operation speed and decreasing the power consumption for various algorithms.

SUMMARY

The disclosure provides a memory apparatus capable of performing AI operations and an operation method thereof, which can arrange data in a feature map at an appropriate storage address according to a weight matrix (also referred to as a convolution kernel or a filter) to be used in neural network operations, and can perform a convolution operation in the memory apparatus with a built-in logic operation unit (such as a multiply-accumulate (MAC) unit).

A memory apparatus of the disclosure is adapted for artificial intelligence operation. The memory apparatus includes a mode configuration register, a system memory array, a pointer and an arithmetic circuit including a plurality of logic operation units. The mode configuration register is configured to store weight matrix information and a base address. The system memory array is configured to store a plurality of feature values in a feature map from the base address according to the weight matrix information. The pointer is coupled to the mode configuration register and the system memory array. The pointer is configured to receive and store the base address and a weight matrix size to provide pointer information. The arithmetic circuit is coupled to the mode configuration register and the pointer. The arithmetic circuit is configured to sequentially or parallelly read the feature values according to the pointer information. The arithmetic circuit is further configured to parallelly arrange a plurality of weight coefficients of a selected weight matrix and the corresponding feature values in each of the logic operation units according to the weight matrix information, and the logic operation units are configured to perform computing operations parallelly to generate a plurality of intermediate layer feature values. The arithmetic circuit is further configured to output the intermediate layer feature values to an external processing unit.

An operation method of a memory apparatus of the disclosure is adapted to the memory apparatus including a system memory array, a pointer and a plurality of logic operation units. The operation method includes the following: storing weight matrix information and a base address; storing a plurality of feature values in a feature map from the base address according to the weight matrix information in the system memory array; storing the base address and a weight matrix size in the pointer to provide pointer information; reading the feature values sequentially or parallelly according to the pointer information; arranging a plurality of weight coefficients in a selected weight matrix and the corresponding feature values parallelly in each of the corresponding logic operation units according to the weight matrix information; performing computing operations parallelly by the logic operation units to generate a plurality of intermediate layer feature values; and outputting the intermediate layer feature values to an external processing unit.

Based on the above, the memory apparatus and the operation method thereof in the disclosure may make full use of the built-in logic operation units to process a large number of dense matrix operations parallelly, so as to share the operation load required for the hidden layer.

In this way, the disclosure not only improves the operation speed of neural network operations but also significantly decreases the amount of data transferred between the processing chip and the memory apparatus, thereby decreasing power consumption.

In order to make the aforementioned features and advantages of the disclosure comprehensible, embodiments accompanied with drawings are described in detail below.

BRIEF DESCRIPTION OF THE DRAWINGS

FIG. 4 is an example of a configuration manner of each logic operation unit according to an embodiment of the disclosure.

FIGS. 6A to 6D are examples of an operation method of a memory apparatus according to an embodiment of the disclosure.

DESCRIPTION OF THE EMBODIMENTS

When the hidden layer is observed, it can be seen that the operation basis of the convolutional neural network or deep neural network is actually a large number of dense matrix operations. The range of the matrix operation (the size of the columns and rows) depends on the weight matrix used when the convolution operation is performed on the feature map. Based on the above, the disclosure can automatically break down matrix operations according to weight matrix information to appropriately arrange storage addresses of feature values possessed by the feature map. In addition, the memory apparatus of the disclosure includes built-in logic operation units. In this way, a matrix operation may be performed on feature values stored in the specific storage addresses of the memory apparatus and weight coefficients by the built-in logic operation units to share the operation load required for the hidden layer by the memory apparatus.

Figure 1:
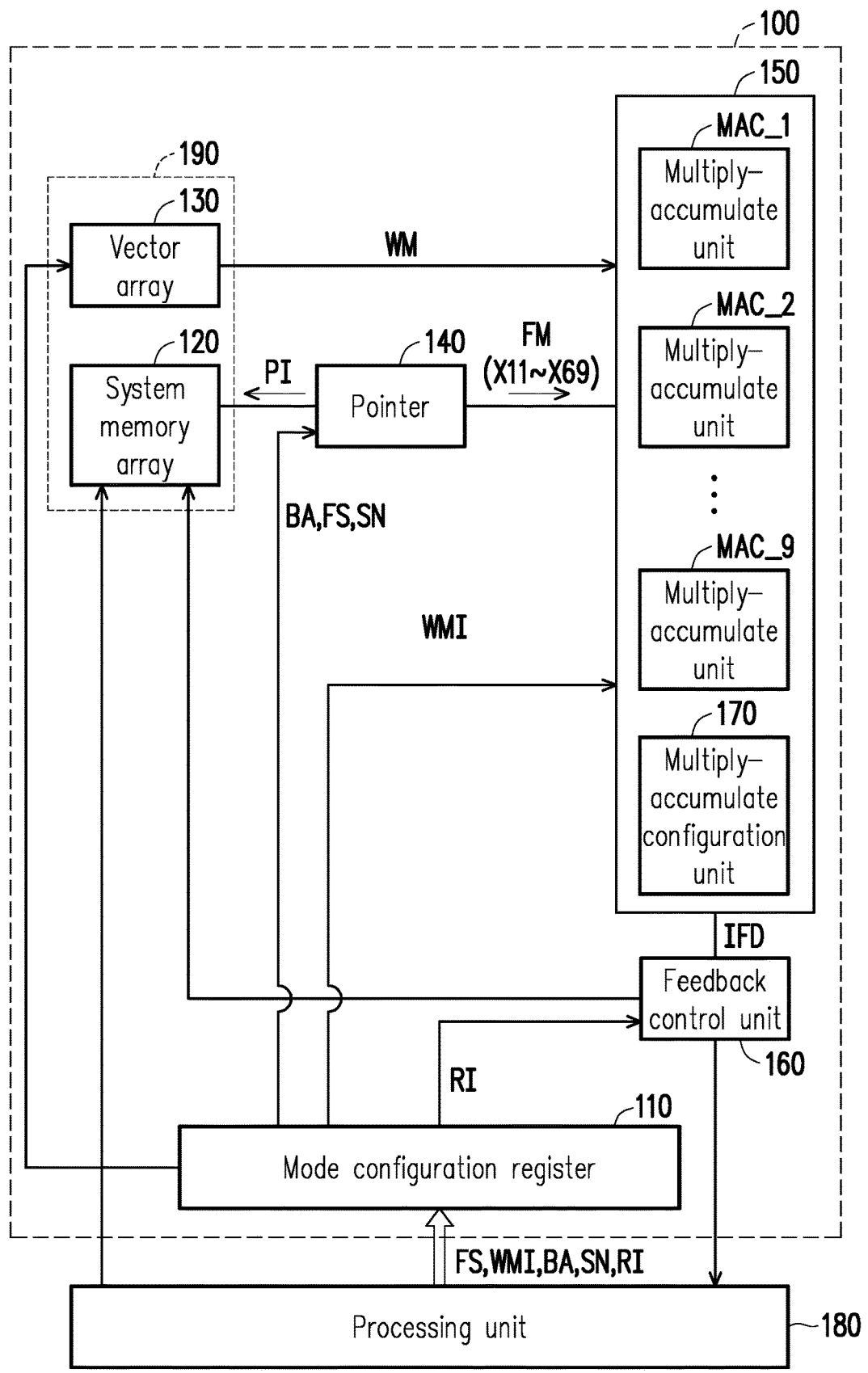
FIG. 1 is a schematic circuit diagram of a memory apparatus according to an embodiment of the disclosure.

Hereinafter, please refer to FIG. 1. FIG. 1 is a schematic circuit diagram of a memory apparatus according to an embodiment of the disclosure. In FIG. 1, a memory apparatus 100 is coupled to an external processing unit 180. The processing unit 180 is, for example, a central processing unit (CPU), a graphics processing unit (GPU), a tensor processing unit (TPU), or other programmable general-purpose or special-purpose microprocessors, or a digital signal processor (DSP), a programmable controller, an application specific integrated circuit (ASIC), a programmable logic device (PLD) or other similar apparatuses or a combination of these apparatuses.

The memory apparatus 100 according to the embodiment of the disclosure may perform a convolution operation of a weight matrix and a feature map in a hidden layer. In detail, when image analysis is performed through a neural network model, a user may give a weight matrix to be used in the convolution operation through the processing unit 180. Then, the memory apparatus 100 may sequentially slide the weight matrix in a specific feature map according to a stride setting, and perform the convolution operation on the weight matrix and a corresponding area in the feature map that is associated to the weight matrix, until all areas in the feature map are scanned by the weight matrix to thereby generate a new feature map. That is, the memory apparatus 100 may divide a specific feature map into a plurality of areas according to the size of the weight matrix, and then compute a new feature map by performing computing operations on the feature values in each area and the weight matrix.

As shown in FIG. 1, the memory apparatus 100 includes a mode configuration register 110, a system memory array 120, a vector array 130, a pointer 140, an arithmetic circuit 150 and a feedback control unit 160. The arithmetic circuit 150 includes a plurality of logic operation units. The logic operation unit may include any one of a multiply-accumulate (MAC) unit, an arithmetic logic unit (ALU), a floating point unit (FPU), or a combination thereof. In this embodiment, these logic operation units include a plurality of multiply-accumulate units MAC_1 to MAC_9. In another embodiment not shown, these logic operation units include a plurality of arithmetic logic units. In further another embodiment not shown, these logic operation units include a plurality of floating point units.

The mode configuration register 110 may store weight matrix information WMI and a base address BA. The weight matrix information WMI includes relevant information such as a selected weight matrix WM to be used in the convolution operation, and a weight matrix size FS (number of columns and rows). The user may store the weight matrix information WMI and the base address BA in the mode configuration register 110 through the processing unit 180. However, in other embodiments, the weight matrix information WMI and the base address BA may be stored in the mode configuration register 110 in advance in any methods, and the disclosure is not limited thereto.

The system memory array 120 may be, for example, a volatile memory element such as a dynamic random access memory (DRAM) and a static random access memory (SRAM), or may be configured by a non-volatile memory element, such as a flash memory, a phase change memory and a resistance memory. The processing unit 180 may arrange storage addresses for a plurality of feature values X11 to X69 in a feature map FM from the base address BA of the system memory array 120 according to the weight matrix information. Please refer to FIG. 2 for the following description.

Figure 2:
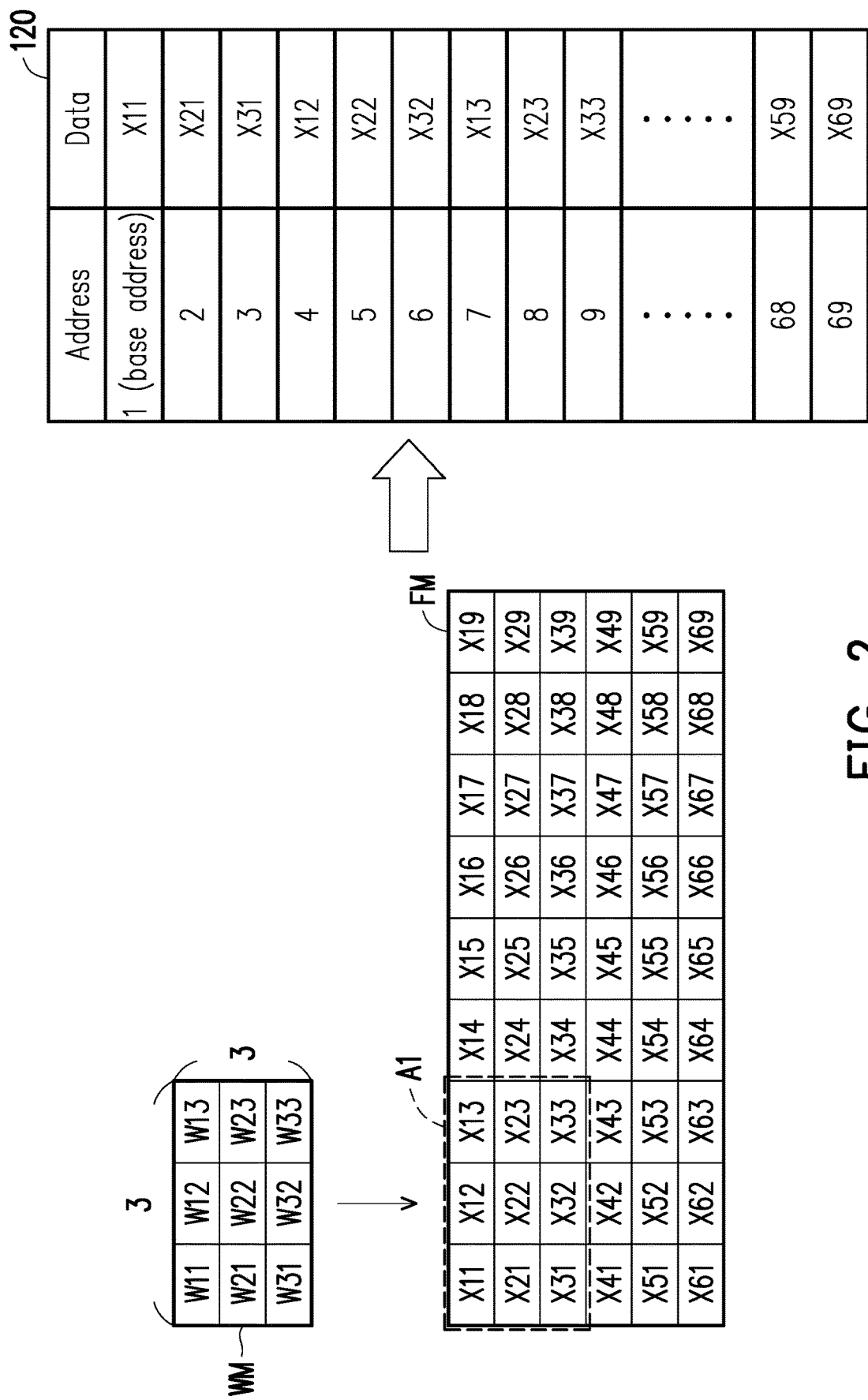
FIG. 2 is an example of an operation method of a memory apparatus according to an embodiment of the disclosure.

FIG. 2 is an example of an operation method of a memory apparatus according to an embodiment of the disclosure. In FIG. 2, the feature map FM includes the feature values X11 to X69, and the weight matrix WM includes weight coefficients W11 to W33. The storage addresses of the data in the system memory array 120 are shown on the right in FIG. 2. In this embodiment, the selected weight matrix WM is exemplified as a 3×3 matrix, but in other embodiments, the convolution operation may be performed on weight matrices of other sizes, and the disclosure is not limited thereto.

The memory apparatus 100 may know from the weight matrix information WMI stored in the mode configuration register 110 that the size of the corresponding area in the feature map FM on which the operation is performed is also a 3×3 matrix. In addition, the memory apparatus 100 may infer that when an area A1, i.e. addresses 1 to 9, is used as the corresponding area for the convolution operation, an operation shown in the following Equation (1) is performed.

$$\begin{bmatrix} W11 & W12 & W13 \\ W21 & W22 & W23 \\ W31 & W32 & W33 \end{bmatrix} \times \begin{bmatrix} X11 & X12 & X13 \\ X21 & X22 & X23 \\ X31 & X32 & X33 \end{bmatrix} = \begin{bmatrix} Z11 & Z12 & Z13 \\ Z21 & Z22 & Z23 \\ Z31 & Z32 & Z33 \end{bmatrix} \quad \text{Equation (1)}$$

In Equation (1), Z11 to Z33 are intermediate layer feature values generated by performing the convolution operation on the weight coefficients W11 to W33 and the feature values X11 to X33.

Therefore, as shown in FIG. 2, the processing unit 180 may arrange the storage addresses of the feature values X11 to X33 in the feature map FM from the base address BA (address 1) of the system memory array 120 according to the weight matrix information WMI, so that the storage addresses of the feature values X11 to X33 may conform to the operation order of the matrices in Equation (1). That is, since the number of columns of the selected weight matrix WM is 3, the processing unit 180 arranges the three feature values X11 to X31 of the same column and the three feature values X12 to X32 of the next column in consecutive storage addresses (address 1 to address 6) in the system memory array 120, so as to conform to the operation order of the matrices in Equation (1). The storage addresses of other feature values may be deduced by analogy.

Please refer to FIG. 1 again. The vector array 130 may be, for example, a volatile memory element such as a dynamic random access memory (DRAM) and a static random access memory (SRAM), or may be configured by a non-volatile memory element, such as a flash memory, a phase change memory and a resistance memory. The vector array 130 is coupled to the mode configuration register 110 and the arithmetic circuit 150. The vector array 130 stores a plurality of weight matrices. The vector array 130 may select a selected weight matrix WM to be used from the stored weight matrices according to the weight matrix information WMI stored in the mode configuration register 110 to provide it to the arithmetic circuit 150.

In addition, as shown in FIG. 1, in the present embodiment, the system memory array 120 and the vector array 130 are integrated in the same main memory array 190 of the memory apparatus 100. In addition, for example, the memory addresses and ranges of the system memory array 120 and the vector array 130 may be adjusted according to the information stored in the mode configuration register 110. However, the disclosure is not limited thereto. In other embodiments, the system memory array is the main memory array and the vector array may be located in a different memory array separated from the main memory array.

The pointer 140 is coupled to the mode configuration register 110, the system memory array 120, and the arithmetic circuit 150. The pointer 140 may receive and store the base address BA and the weight matrix size FS from the mode configuration register 110 to provide pointer information PI. Specifically, the user may store the base address BA, the weight matrix size FS and a stride setting SN in the mode configuration register 110 through the processing unit 180 to provide them to the pointer 140. With proper circuit configuration and operation, a data length DL of the feature values used in the convolution operation may be calculated based on the weight matrix size FS, so that the pointer information PI provided by the pointer 140 may indicate the storage addresses of the feature values in the system memory array 120 for each convolution operation to allow the arithmetic circuit 150 to correctly read the required feature values.

Figure 3:
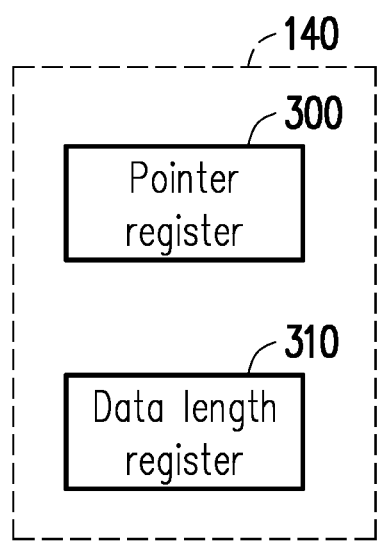
FIG. 3 is a schematic circuit diagram of a pointer according to an embodiment of the disclosure.

For example, FIG. 3 is a schematic circuit diagram of a pointer according to an embodiment of the disclosure. The pointer 140 includes a pointer register 300 and a data length register 310. The pointer register 300 is configured to receive and store the current base address BA (address 1). The data length register 310 is configured to receive and store the data length DL of the feature values of the corresponding area where the convolution operation will be performed on. When the area A1 in the feature map FM in FIG. 2 is used as the corresponding area for the convolution operation, since the area A1 includes 9 feature values X11 to X33, its data length DL is 9. According to this, the pointer 140 may provide the pointer information PI according to the contents stored in the pointer register 300 and the data length register 310 to indicate the storage addresses (address 1 to address 9) of the feature values X11 to X33 in the system memory array 120.

Please refer to FIG. 1 again. The arithmetic circuit 150 is coupled to the mode configuration register 110, the vector array 130, and the pointer 140. When the selected weight matrix WM is used to perform the convolution operation on corresponding areas in the feature map FM, the arithmetic circuit 150 may sequentially read the feature values X11 to X69 according to the pointer information PI. Next, the arithmetic circuit 150 may respectively arrange the weight coefficients W11 to W33 of the selected weight matrix WM and the corresponding feature values to each of the corresponding multiply-accumulate units MAC_1 to MAC_9 according to the weight matrix information WMI, cause the multiply-accumulate units MAC_1 to MAC_9 to perform a multiply-accumulate operation parallelly to generate a plurality of intermediate layer feature values IFD, and output these intermediate layer feature values IFD to the processing unit 180 sequentially or parallelly.

First, a case is described where the area A1 of the feature map FM shown in FIG. 2 is used as the corresponding area for the convolution operation. In this case, the base address BA stored in the pointer register 300 of the pointer 140 is the storage address (address 1) of the feature value X11 in the system memory array 120. The data length DL of the feature values used in the convolution operation on the area A1 that is stored in the data length register 310 is 9. The arithmetic circuit 150 may sequentially or parallelly read the feature values X11 to X33 corresponding to the address 1 to the address 9 from the system memory array 120 according to the pointer information PI provided by the pointer 140.

Next, the arithmetic circuit 150 may parallelly arrange the weight coefficients W11 to W33 of the selected weight matrix WM and the feature values X11 to X33 to the multiply-accumulate units MAC_1 to MAC_9 according to the weight matrix information WMI.

For example, FIG. 4 is an example of a configuration manner of each logic operation unit according to an embodiment of the disclosure. According to the weight matrix information WMI, the arithmetic circuit 150 may know that the convolution operation is to be performed with the 3×3 selected weight matrix WM. Therefore, as shown in FIG. 4, the arithmetic circuit 150 arranges three column weight coefficients of the selected weight matrix WM with three row feature values of the feature map FM into the multiply-accumulate units MAC_1 to MAC_9, respectively.

In FIG. 4, each of the multiply-accumulate units MAC_1 to MAC_9 includes a first buffer BF1, a second buffer BF2 and a third buffer BF3. As shown in FIG. 4, the arithmetic circuit 150 may, according to the weight matrix information WMI, arrange the weight coefficients W11 to W33 in the first buffers BF1 of the multiply-accumulate units MAC_1 to MAC_9, and arrange the feature values X11 to X33 in the second buffers BF2 of the multiply-accumulate units MAC_1 to MAC_9. For example, as shown in FIG. 4, in the multiply-accumulate unit MAC_1, the arithmetic circuit 150 arranges the three column weight coefficients W11, W12, and W13 of the selected weight matrix WM in the first buffer BF1, and arranges the three row feature values X11, X21, and X31 of the feature map FM in the second buffer BF2, to correspond to the matrix operation in Equation (1). The configuration manners of other multiply-accumulate units may be deduced by analogy.

The first buffer BF1, the second buffer BF2, and the third buffer BF3 in each of the multiply-accumulate units MAC_1 to MAC_9 may be implemented, for example, by a specific range of memory arrays. The first buffer BF1, the second buffer BF2, and the third buffer BF3 may be implemented by a register, a static random access memory, a dynamic random access memory, or a combination thereof. Making full use of the characteristic that data in a memory array may be read parallelly, the disclosure reads data from the system memory array 120 parallelly to the multiply-accumulate units MAC_1 to MAC_9, and causes the multiply-accumulate units MAC_1 to MAC_9 to perform the multiply-accumulate operation parallelly in the arithmetic circuit 150.

In addition, the intermediate layer feature values Z11 to Z33 are temporarily stored in the third buffers BF3 of the multiply-accumulate units MAC_1 to MAC_9 through a proper circuit configuration, and are output sequentially or parallelly from the third buffers BF3.

It should be noted that the sizes of the first buffer BF1, the second buffer BF2, and the third buffer BF3 may be appropriately adjusted according to the size of the selected weight matrix WM. Furthermore, since in the memory apparatus 100 of the disclosure, the multiply-accumulate units MAC_1 to MAC_9 may be used to perform the multiply-accumulate operation parallelly, the time required for the operation may be decreased significantly, and the processing speed may be increased significantly.

In addition, in an embodiment, the arithmetic circuit 150 may further include a multiply-accumulate configuration unit 170. The multiply-accumulate configuration unit 170 may include, for example, a plurality of logic gates designed according to requirements. The multiply-accumulate configuration unit 170 is configured to divide the multiply-accumulate units MAC_1 to MAC_9 into a plurality of groups according to the weight matrix information WMI, so as to control the multiply-accumulate units in the same group to perform the multiply-accumulate operation parallelly and to control the multiply-accumulate units in different groups to perform the multiply-accumulate operation sequentially.

In FIG. 1, the feedback control unit 160 may include, for example, a transfer gate. The feedback control unit 160 is coupled to the mode configuration register 110, the system memory array 120 and the arithmetic circuit 150. In an embodiment, the processing unit 180 may store retention information RI in the mode configuration register 110. When the intermediate layer feature values IFD need to be used for a next-level operation, the feedback control unit 160 may store the intermediate layer feature values IFD back to the system memory array 120 according to the retention information RI provided by the mode configuration register 110 as new feature values. In an embodiment, the intermediate layer feature values IFD overwrite the feature values originally stored in the designated positions of the system memory array 120, so as to update the feature values under the requirement of saving memory space. In detail, the retention information RI is configured to enable the feedback control unit 160, so that the intermediate layer feature values IFD output by the arithmetic circuit 150 are provided to the system memory array 120 for storage instead of being output to the processing unit 180. In addition, the feedback control unit 160 may further include a counter configured to control the transfer gate, and the retention information RI may also include the number of times for which the intermediate layer feature values IFD are stored back to the system memory array 120. In this way, the feedback control unit 160 may store the multiple intermediate layer feature values IFD iteratively calculated by the arithmetic circuit 150 back to the system memory array 120 in batches according to the retention information RI, so as to automatically perform the feedback and iterative calculation of data.

Figure 5:
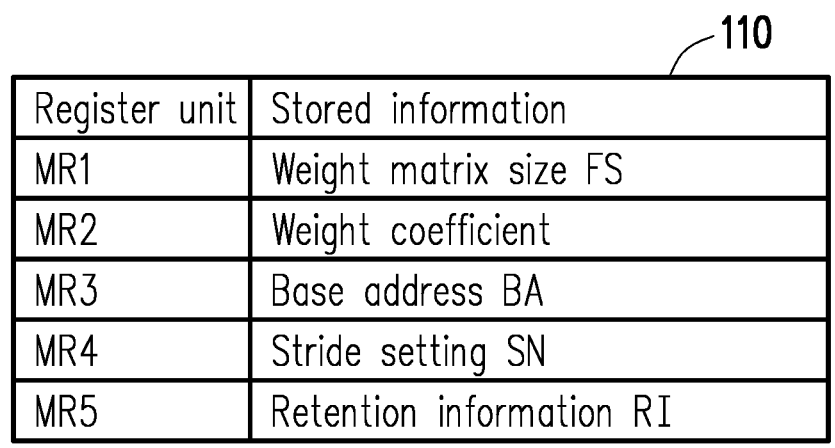
FIG. 5 is an example of a configuration manner of a mode configuration register according to an embodiment of the disclosure.

FIG. 5 is an example of a configuration manner of a mode configuration register according to an embodiment of the disclosure. As shown in FIG. 5, in an embodiment, the mode configuration register 110 may include a plurality of register units MR1 to MR5. The register unit MR1 stores the weight matrix size FS. The register unit MR2 stores the weight coefficients. The register unit MR3 stores the base address BA. The register unit MR4 stores the stride setting SN. The register unit MR5 stores the retention information RI.

Next, after the convolution operation of the area A1 in the feature map FM shown in FIG. 2 is completed, the pointer 140 may update the base address stored in the pointer register 300 according to the base address currently stored in the pointer register 300, the weight matrix information WMI and the stride setting SN, so as to provide the updated pointer information PI. In this way, sliding may be performed in the feature map FM according to the stride setting SN to select a new area for the convolution operation.

Figures 6A, 6B, 6C:
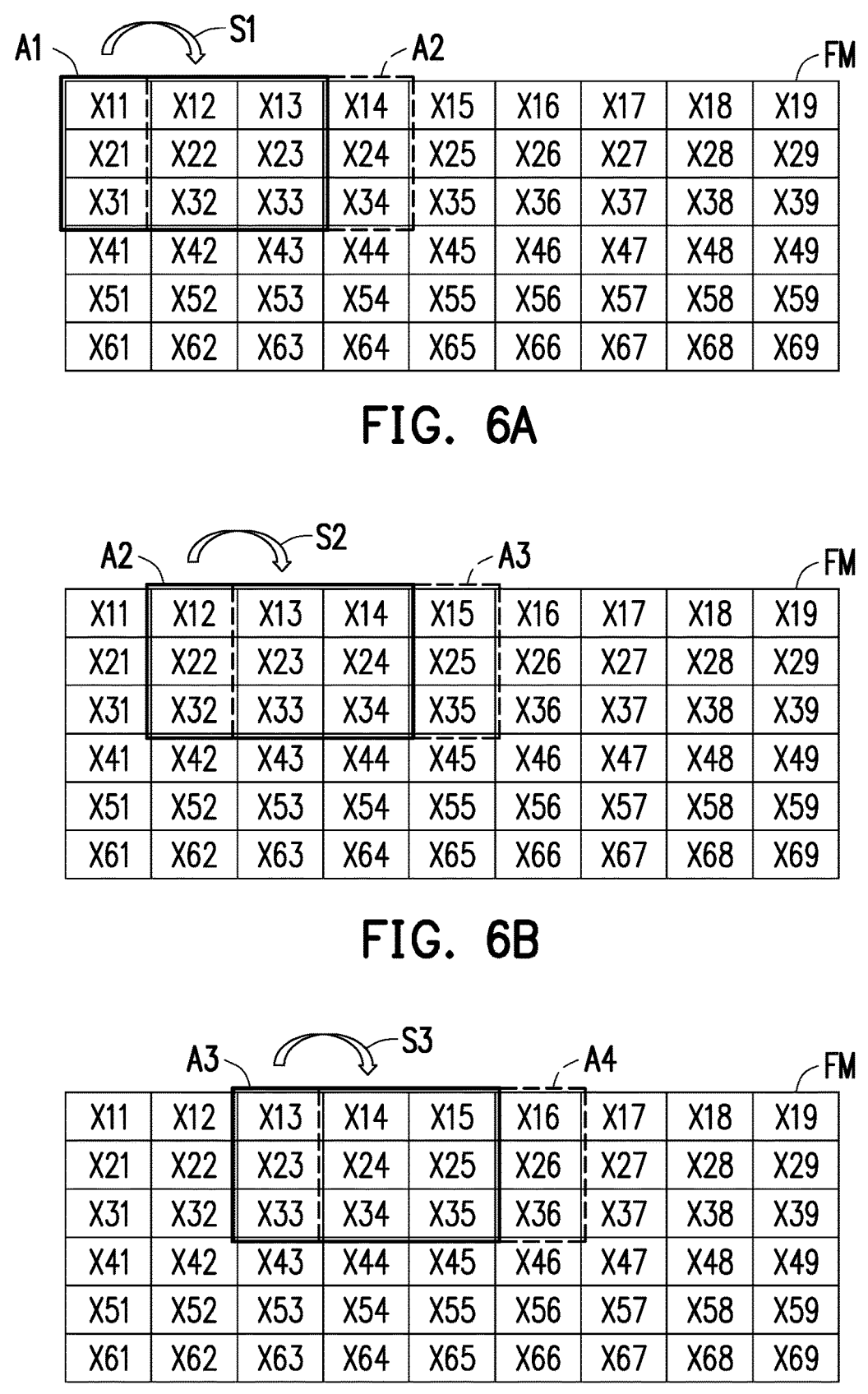

The following is an example to illustrate how the system memory array 120 is read after the pointer information PI is updated to slide to select a new area when the stride setting SN is 1. FIGS. 6A to 6D are examples of an operation method of a memory apparatus according to an embodiment of the disclosure. FIGS. 6A to 6C show sliding operations S1 to S3, respectively, in which sliding is performed on the feature map FM sequentially to select areas A2 to A4. FIG. 6D shows a plurality of pointer information PI provided by the pointer 140 before the sliding operation S1 and during the sliding operations S1 to S3, and the feature values corresponding to each of the areas A1 to A4 read from the system memory array 120 according to the pointer information PI. The feature values of these areas A1 to A4 are sequentially provided to the arithmetic circuit 150 for the convolution operation.

Specifically, the pointer 140 may update the base address according to the current base address, the number of columns of the selected weight matrix WM and the stride setting SN to perform the sliding operation. The updated base address satisfies the following relation:

$$BA\_2 = BA\_1 + [(\text{Column of Filter}) \times SN]$$

$$DL(\text{Data Length}) = \text{Row\_size} \times \text{Column\_size} \qquad \text{Equation (2)}$$

In Equation (2), BA_1 is the current base address (the base address BA currently stored in the pointer register 300). SN is the stride setting. BA_2 is the updated base address. The stride setting SN is related to the resolution of scanning the feature map FM. The stride setting SN may be adjusted as required.

As shown in FIG. 6A, the sliding operation S1 is configured to slide from the area A1 indicated by a solid line to the area A2 indicated by a dotted line. Next, as shown in FIG. 6B, the sliding operation S2 is configured to slide from the area A2 indicated by a solid line to the area A3 indicated by a dotted line. Next, as shown in FIG. 6C, the sliding operation S3 is configured to slide from the area A3 indicated by a solid line to the area A4 indicated by a dotted line.

In order to realize the sliding operations S1 to S3, the pointer 140 has to provide corresponding pointer information PI for each sliding operation. As shown in FIG. 6D, before the sliding operation S1, the pointer information PI_1 provided by the pointer 140 indicates the address 1; that is, the base address stored in the pointer register 300 is the address 1 for performing the convolution operation on the area A1.

In the sliding operation S1, when the number of columns of the selected weight matrix WM is 3 and the stride setting SN is 1, the current base address BA_1 is substituted by the address 1 in Equation (2), and it can be obtained that the updated base address BA_2 is 4 (address 4). In this way, as shown in FIG. 6D, the arithmetic circuit 150 may sequentially read the feature values X12 to X34 stored in the address 4 to the address 12 according to the updated pointer information PI_2 provided by the pointer 140 to perform the convolution operation on the area A2.

In the sliding operation S2, when the number of columns of the selected weight matrix WM is 3 and the stride setting SN is 1, the current base address BA_1 is substituted by the address 4 in Equation (2), and it can be obtained that the updated base address BA_2 is 7 (address 7). In this way, as shown in FIG. 6D, the arithmetic circuit 150 may sequentially read the feature values X13 to X35 stored in the address 7 to the address 15 according to the updated pointer information PI_3 provided by the pointer 140 to perform the convolution operation on the area A3.

In the sliding operation S3, when the number of columns of the selected weight matrix WM is 3 and the stride setting SN is 1, the current base address BA_1 is substituted by the address 7 in Equation (2), and it can be obtained that the updated base address BA_2 is 10 (address 10). In this way, as shown in FIG. 6D, the arithmetic circuit 150 may sequentially read the feature values X14 to X36 stored in the address 10 to the address 18 according to the updated pointer information PI_4 provided by the pointer 140 to perform the convolution operation on the area A4. In the same way, the arithmetic circuit 150 may sequentially read the remaining feature values in the feature map FM according to the pointer information PI provided by the pointer 140 and perform the convolution operation until all areas in the feature map FM are scanned.

Figure 7A:
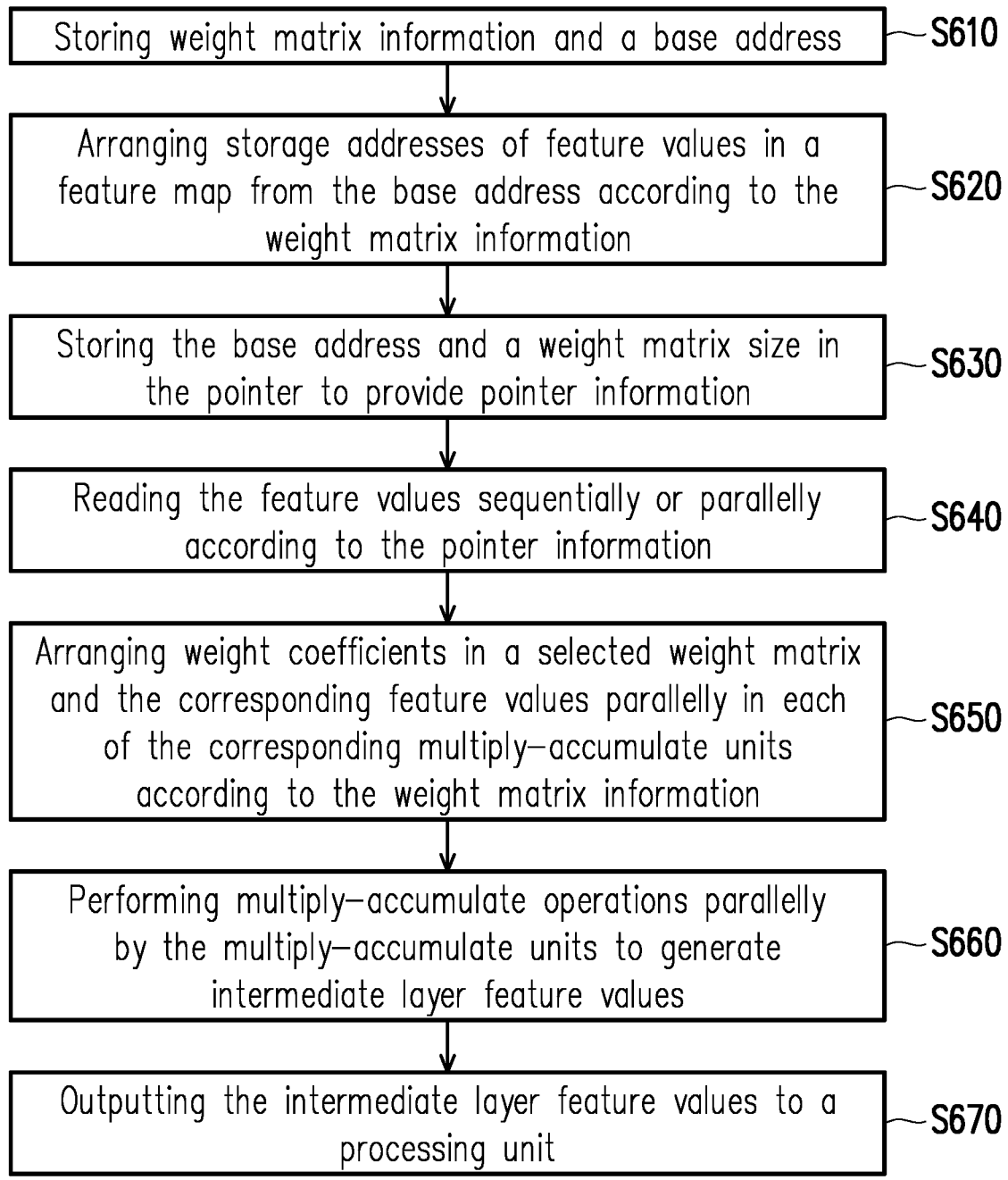
FIGS. 7A to 7C are flowcharts of operation methods of a memory apparatus according to an embodiment of the disclosure.

FIG. 7A is a flowchart of an operation method of a memory apparatus according to an embodiment of the disclosure. Please refer to FIG. 7A. The operation method of the memory apparatus in the present embodiment includes the following steps. Weight matrix information and a base address are stored (step S610). Next, storage addresses of a plurality of feature values in a feature map are arranged from the base address according to the weight matrix information (step S620). Then, the base address and a weight matrix size are stored in the pointer to provide pointer information (step S630). The feature values are read sequentially or parallelly according to the pointer information (step S640). Next, a plurality of weight coefficients in a selected weight matrix and the corresponding feature values are arranged parallelly in each of the corresponding logic operation units according to the weight matrix information (step S650). In this embodiment, these logic operation units include a plurality of multiply-accumulate units. Multiply-accumulate operations are performed parallelly by the multiply-accumulate units to generate a plurality of intermediate layer feature values (step S660). The intermediate layer feature values are output to a processing unit (step S670).

Figure 7B:
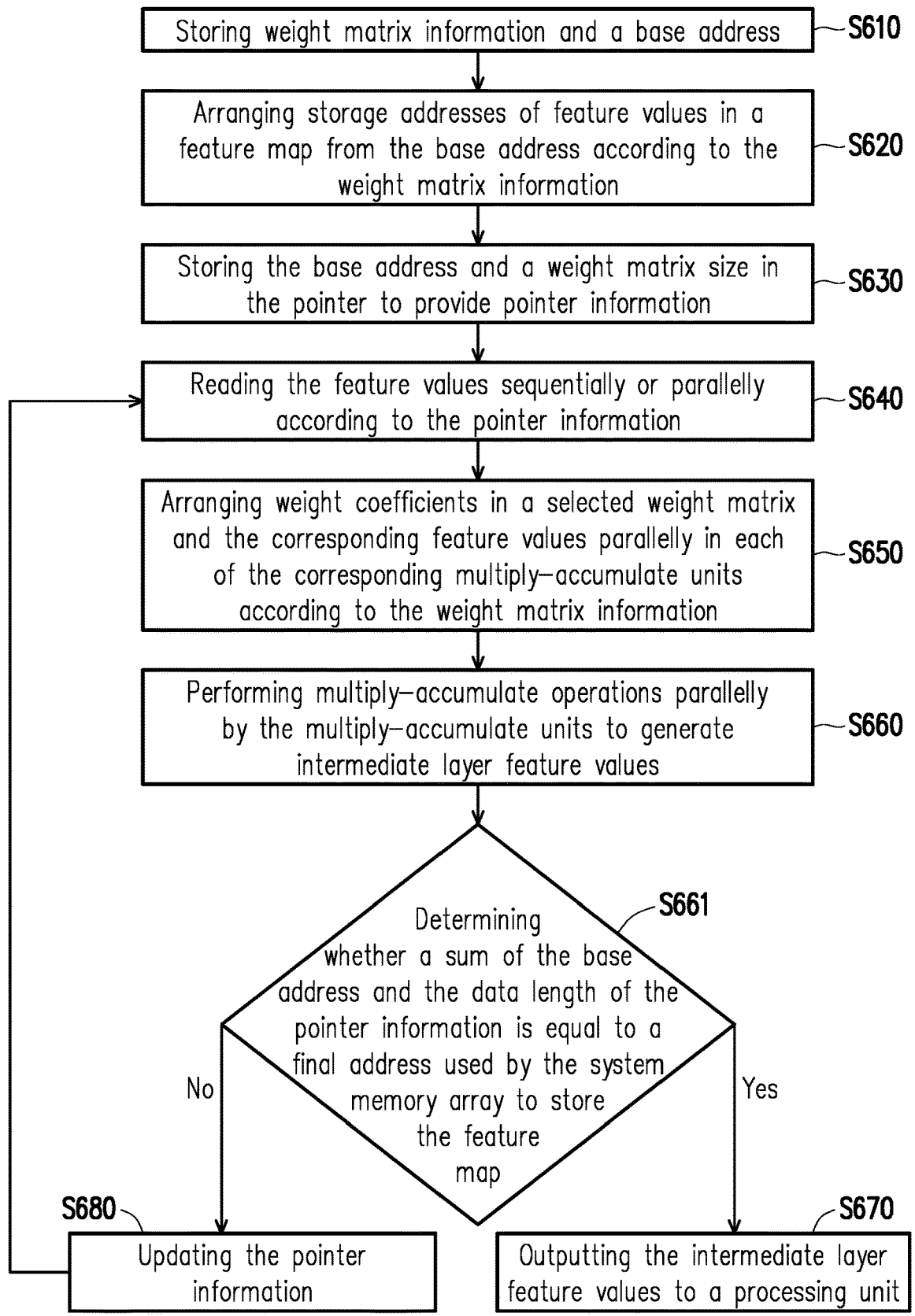

FIG. 7B is also a flowchart of an operation method of a memory apparatus according to an embodiment of the disclosure. The difference from the previous embodiment is that this embodiment further includes, after step S660, determining whether a sum of the base address and the data length of the pointer information is equal to a final address used by the system memory array to store the feature map (step S661). When the sum of the base address and the data length of the pointer information is equal to the final address used by the system memory array to store the feature map, the intermediate layer feature values are output to the processing unit (step S670). When the sum of the base address and the data length of the pointer information is not equal to the final address used by the system memory array to store the feature map, the pointer information is updated (step S680), and it returns to step S640.

Figure 7C:
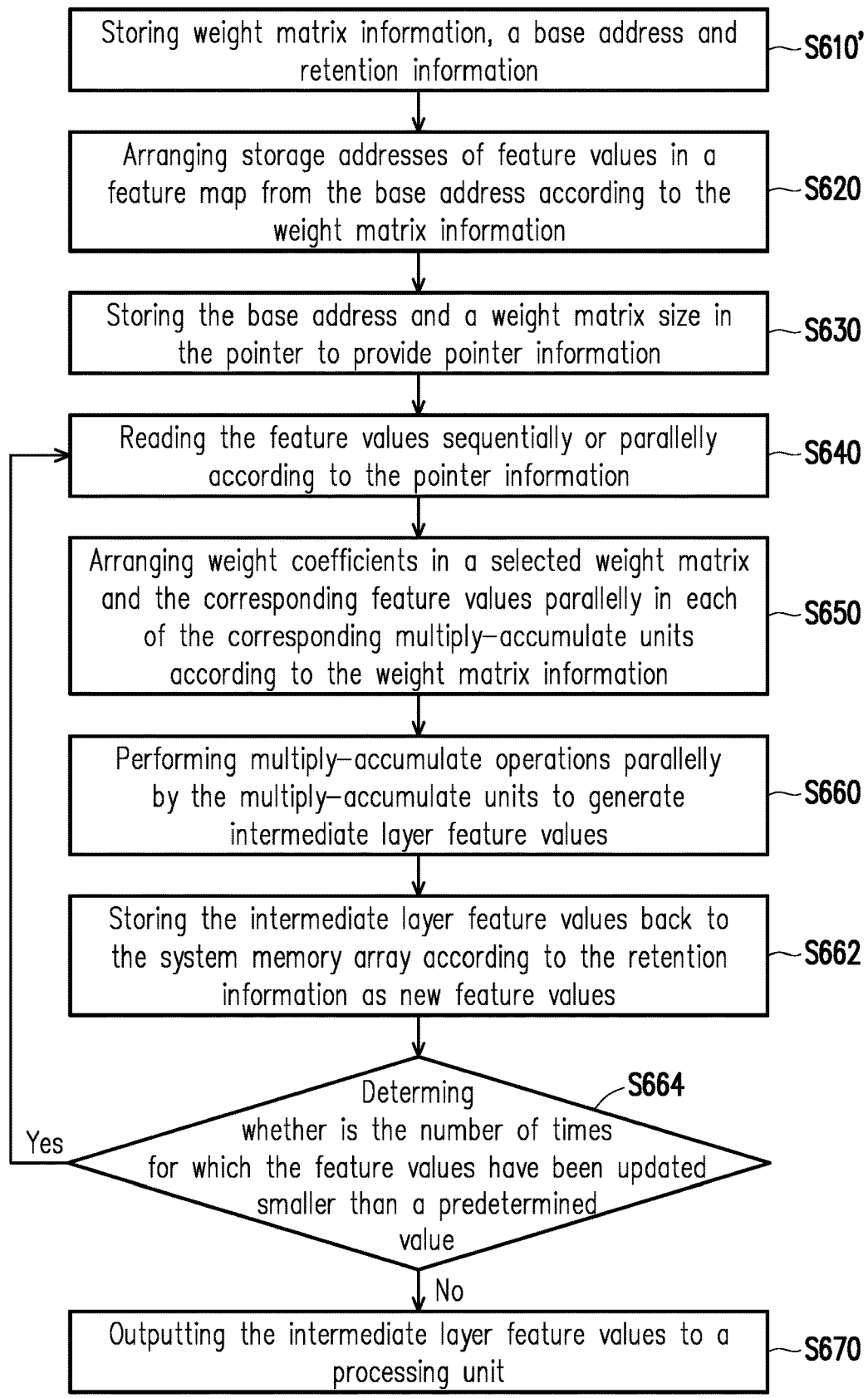

FIG. 7C is also a flowchart of an operation method of a memory apparatus according to an embodiment of the disclosure. The difference from the previous embodiment is that in this embodiment, step S610' further includes storing retention information. Furthermore, after step S660 and before step S670, the intermediate layer feature values are stored back to the system memory array according to the retention information as new feature values (step S662). In an embodiment, the retention information includes the number of times for which the feature values are updated, and the multiple intermediate layer feature values are stored back to the system memory array in batches according to the retention information. Accordingly, the number of times for which the feature values have been updated are determined in step S664, if the number of times for which the feature values have been updated is smaller than a predetermined value, then returns to step S640. Otherwise, that is, if the number of times for which the feature values have been updated reaches the predetermined value, then go to step S670. For details of the above steps, reference may be made to the embodiments in FIG. 1 to FIG. 6D, and details are not described herein again.

In summary, the memory apparatus and the operation method thereof in the disclosure may make full use of the built-in logic operation units to process a large number of dense matrix operations parallelly. Once the relevant information of the weight matrix used in the convolution operation is provided, the operation load required for the hidden layer may be decreased by the memory apparatus of the disclosure. In this way, the disclosure not only improves the operation speed of neural network operations but also significantly decreases the amount of data transferred between the processing chip and the memory apparatus, thereby decreasing power consumption.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A memory apparatus adapted for artificial intelligence operation, the memory apparatus comprising:
   a mode configuration register configured to store weight matrix information and a base address;
   a system memory array configured to store a plurality of feature values in a feature map from the base address according to the weight matrix information;
   a pointer coupled to the mode configuration register and the system memory array, and configured to receive and store the base address and a weight matrix size to provide pointer information; and
   an arithmetic circuit coupled to the mode configuration register and the pointer, and configured to sequentially or parallelly read the feature values according to the pointer information,
   wherein the arithmetic circuit comprises a plurality of logic operation units, and the arithmetic circuit is further configured to parallelly arrange a plurality of weight coefficients of a selected weight matrix and the corresponding feature values in each of the logic operation units according to the weight matrix information, and the logic operation units are configured to perform computing operations parallelly to generate a plurality of intermediate layer feature values, and the arithmetic circuit is further configured to output the intermediate layer feature values to an external processing unit.

2. The memory apparatus according to claim 1, wherein each of the logic operation units comprises a multiply-accumulate unit, a first buffer, a second buffer and a third buffer, and
the arithmetic circuit is configured to arrange the weight coefficients in the first buffer and arrange the corresponding feature values in the second buffer according to the weight matrix information, so as to provide the corresponding intermediate layer feature values in the third buffer.

3. The memory apparatus according to claim 1, wherein the mode configuration register further stores a stride setting, and
the pointer comprises:
a pointer register receiving and storing the base address; and
a data length register receiving and storing a data length calculated based on the weight matrix size,
wherein the pointer is configured to update the base address stored in the pointer register according to the base address currently stored in the pointer register, the weight matrix information and the stride setting to provide an updated pointer information, so as to slide in the feature map according to the stride setting.

4. The memory apparatus according to claim 1, wherein the memory apparatus further comprises:
a vector array coupled to the mode configuration register and the arithmetic circuit, and configured to store a plurality of weight matrices,
wherein the vector array selects the selected weight matrix from the weight matrices according to the weight matrix information to provide the selected weight matrix to the arithmetic circuit.

5. The memory apparatus according to claim 1, wherein the arithmetic circuit further comprises:
a logic operation configuration unit configured to divide the logic operation units into a plurality of groups according to the weight matrix information, so as to control the logic operation units in a same group to perform the operation parallelly and to control the logic operation units in different groups to perform the operation sequentially.

6. The memory apparatus according to claim 1, wherein the mode configuration register further stores retention information, and
the memory apparatus further comprises:
a feedback control unit coupled to the mode configuration register, the system memory array and the arithmetic circuit, and to store the intermediate layer feature values back to the system memory array according to the retention information as new feature values.

7. The memory apparatus according to claim 6, wherein the retention information comprises the number of times for which the intermediate layer feature values are stored back to the system memory array, and
the feedback control unit comprises a counter configured to control a transfer gate to store the intermediate layer feature values back to the system memory array according to the number of times.

8. The memory apparatus according to claim 3, wherein the pointer is configured to determine whether a sum of the base address and the data length reaches a final address used by the system memory array to store the feature map,
when the sum of the base address and the data length reaches the final address, the arithmetic circuit outputs the intermediate layer feature values to the processing unit, and
when the sum of the base address and the data length is not equal to the final address, the pointer updates the pointer information.

9. The memory apparatus according to claim 1, wherein each of the logic operation units comprises an arithmetic logic unit, a first buffer, a second buffer and a third buffer, and
the arithmetic circuit is configured to arrange the weight coefficients in the first buffer and arranges the corresponding feature values in the second buffer according to the weight matrix information, so as to provide the corresponding intermediate layer feature values in the third buffer.

10. The memory apparatus according to claim 1, wherein each of the logic operation units comprises a floating point unit, a first buffer, a second buffer and a third buffer, and
the arithmetic circuit is configured to arrange the weight coefficients in the first buffer and arranges the corresponding feature values in the second buffer according to the weight matrix information, so as to provide the corresponding intermediate layer feature values in the third buffer.

11. An operation method of a memory apparatus, adapted to the memory apparatus comprising a system memory array, a pointer and a plurality of logic operation units, the operation method comprising:
storing weight matrix information and a base address;
storing a plurality of feature values in a feature map from the base address according to the weight matrix information in the system memory array;
storing the base address and a weight matrix size in the pointer to provide pointer information;
reading the feature values sequentially or parallelly according to the pointer information;
arranging a plurality of weight coefficients in a selected weight matrix and the corresponding feature values parallelly in each of the corresponding logic operation units according to the weight matrix information;
performing computing operations parallelly by the logic operation units to generate a plurality of intermediate layer feature values; and
outputting the intermediate layer feature values to an external processing unit.

12. The operation method of the memory apparatus according to claim 11, wherein each of the logic operation units comprises a multiply-accumulate unit, a first buffer, a second buffer and a third buffer, and
arranging the weight coefficients in the selected weight matrix and the corresponding feature values parallelly in each of the corresponding logic operation units according to the weight matrix information comprises:
arranging the weight coefficients in the first buffer and arranging the corresponding feature values in the second buffer according to the weight matrix information, so as to provide the corresponding intermediate layer feature values in the third buffer.

13. The operation method of the memory apparatus according to claim 11, wherein the pointer further comprises a pointer register, and the operation method further comprises:
calculating a data length based on the weight matrix size;
updating the base address stored in the pointer register according to the base address currently stored in the pointer register, the weight matrix information and a stride setting to provide an updated pointer information, so as to slide in the feature map according to the stride setting.

14. The operation method of the memory apparatus according to claim 11, further comprising:
   selecting the selected weight matrix from a plurality of weight matrices according to the weight matrix information to provide the selected weight matrix to the logic operation units.

15. The operation method of the memory apparatus according to claim 11, wherein performing the operation parallelly by the logic operation units comprises:
   dividing the logic operation units into a plurality of groups according to the weight matrix information;
   controlling the logic operation units in a same group to perform the operation parallelly; and
   controlling the logic operation units in different groups to perform the operation sequentially.

16. The operation method of the memory apparatus according to claim 11, further comprising:
   storing the intermediate layer feature values according to retention information as new feature values.

17. The operation method of the memory apparatus according to claim 16, wherein the retention information comprises the number of times for which the intermediate layer feature values are stored, and
   wherein storing the intermediate layer feature values according to the retention information as the new feature values comprises:
   storing the intermediate layer feature values according to the number of times.

18. The operation method of the memory apparatus according to claim 13, wherein after performing the operation parallelly by the logic operation units to generate the intermediate layer feature values, the operation method further comprises:
   determining whether a sum of the base address and the data length reaches a final address used to store the feature map;
   when the sum of the base address and the data length reaches the final address, outputting the intermediate layer feature values to the processing unit; and
   when the sum of the base address and the data length is not equal to the final address, updating the pointer information.

* * * * *